(12) United States Patent
Lee

(10) Patent No.: US 11,372,454 B2
(45) Date of Patent: Jun. 28, 2022

(54) DISPLAY APPARATUS

(71) Applicant: Samsung Display Co., LTD., Yongin-si (KR)

(72) Inventor: Ji Heon Lee, Hwaseong-si (KR)

(73) Assignee: SAMSUNG DISPLAY CO., LTD., Yongin-si (KR)

(*) Notice: Subject to any disclaimer, the term of this patent is extended or adjusted under 35 U.S.C. 154(b) by 59 days.

(21) Appl. No.: 16/951,586

(22) Filed: Nov. 18, 2020

(65) Prior Publication Data
US 2021/0200276 A1 Jul. 1, 2021

(30) Foreign Application Priority Data
Dec. 31, 2019 (KR) .................. 10-2019-0178983

(51) Int. Cl.
*G06F 1/16* (2006.01)

(52) U.S. Cl.
CPC .......... *G06F 1/1681* (2013.01); *G06F 1/1616* (2013.01); *G06F 1/1652* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,804,349 B2* | 8/2014 | Lee | ...................... | H05K 5/0017 361/679.01 |
| 11,061,445 B2* | 7/2021 | Kim | ...................... | G06F 1/1652 |
| 11,106,239 B2* | 8/2021 | Yoon | ...................... | G06F 1/1652 |
| 11,243,578 B2* | 2/2022 | Torres | ................... | G06F 1/1616 |
| 11,249,520 B2* | 2/2022 | Han | ........................ | E05D 1/00 |
| 2018/0270971 A1* | 9/2018 | Moon | .................. | G06F 1/1652 |
| 2020/0209918 A1* | 7/2020 | Yoon | .................... | G06F 1/1681 |
| 2020/0375046 A1* | 11/2020 | Sim | ......................... | E05D 7/00 |
| 2020/0383217 A1* | 12/2020 | Kim | ........................ | E05D 3/06 |
| 2021/0026407 A1* | 1/2021 | Park | ..................... | H04M 1/022 |
| 2021/0055763 A1* | 2/2021 | Park | ..................... | G06F 1/1652 |
| 2021/0076511 A1* | 3/2021 | Yang | .................... | H05K 5/0226 |
| 2021/0103313 A1* | 4/2021 | Soh | ....................... | G06F 1/1616 |
| 2021/0120687 A1* | 4/2021 | Kim | ..................... | G06F 1/1681 |
| 2021/0200276 A1* | 7/2021 | Lee | ....................... | G06F 1/1681 |
| 2021/0250431 A1* | 8/2021 | Park | ..................... | G06F 1/1681 |
| 2021/0271294 A1* | 9/2021 | Liao | .................... | H04M 1/0216 |
| 2021/0318723 A1* | 10/2021 | Cheng | .................. | H04M 1/022 |
| 2021/0355988 A1* | 11/2021 | Cheng | .................. | H04M 1/022 |
| 2021/0368032 A1* | 11/2021 | Liao | .................... | H04M 1/022 |
| 2021/0373614 A1* | 12/2021 | Kim | ...................... | G06F 1/1641 |
| 2022/0011817 A1* | 1/2022 | Kim | ...................... | G06F 1/1681 |

* cited by examiner

*Primary Examiner* — Lisa Lea-Edmonds
(74) *Attorney, Agent, or Firm* — Kile Park Reed & Houtteman PLLC

(57) ABSTRACT

A display apparatus includes a flexible display panel including a first non-folding area, a second non-folding area, and a folding area disposed between the first non-folding area and the second non-folding area, and a support structure that supports the flexible display panel. The support structure includes a first support portion, a second support portion, a hinge shaft portion disposed between the first support portion and the second support portion and having a semi-cylindrical shape, a first hinge portion, a second hinge portion, a first sliding portion slidable with respect to the first support portion and the hinge shaft portion, and a second sliding portion slidable with respect to the second support portion and the hinge shaft portion.

20 Claims, 16 Drawing Sheets

DISPLAY APPARATUS

CROSS-REFERENCE TO RELATED APPLICATION(S)

This application claims priority to and benefits of Korean Patent Application No. 10-2019-0178983 under 35 USC § 119, filed on Dec. 31, 2019 in the Korean Intellectual Property Office (KIPO), the entire disclosure of which is incorporated herein by reference.

BACKGROUND

1. Technical Field

Embodiments relate to a hinge structure of a foldable display apparatus.

2. Description of the Related Art

Recently, as technology improves, display products having smaller sizes, lighter weights, and superior performance have been produced. Conventional cathode ray tube (CRT) televisions have been widely used for display apparatuses with many advantages in terms of performance and price. However, display apparatuses such as a plasma display apparatus, a liquid crystal display apparatus, and an organic light emitting diode display apparatus overcome weak points of the CRT in terms of miniaturization and portability, and have advantages such as miniaturization, light weight, and low power consumption.

In the development of a flexible display panel which may be bent, research is being conducted to apply the flexible display panel to a mobile device having a foldable structure. The flexible display panel is disposed on a support portion having a hinge structure, so that the support portion may be folded or unfolded to provide a large screen. Therefore, it is necessary to improve the hinge structure so that the folding and unfolding may be performed without damaging the flexible display panel.

SUMMARY

Embodiments provide a display apparatus having an out-folding hinge structure that supports a flexible display panel.

According to embodiments, a display apparatus may include a flexible display panel including a first non-folding area, a second non-folding area, and a folding area disposed between the first non-folding area and the second non-folding area, and a support structure that supports the flexible display panel. The support structure may include a first support portion that supports the first non-folding area, a second support portion that supports the second non-folding area, a hinge shaft portion disposed between the first support portion and the second support portion, and having a semi-cylindrical shape, a first hinge portion that contacts the hinge shaft portion, is rotatable about a rotation axis of the hinge shaft portion, and extends in a direction toward the first support portion, a second hinge portion that contacts the hinge shaft portion, is rotatable about the rotation axis of the hinge shaft portion, and extends in a direction toward the second support portion, a first sliding portion slidable with respect to the first support portion and the hinge shaft portion, and a second sliding portion slidable with respect to the second support portion and the hinge shaft portion.

In embodiments, the first support portion may include a first reception portion that receives the first sliding portion, and the second support portion may include a second reception portion that receives the second sliding portion. The first reception portion of the first support portion may include a first inclined surface, and the first inclined surface and the first sliding portion may slidably contact each other. The second reception portion of the second support portion may include a second inclined surface, and the second inclined surface and the second sliding portion may slidably contact each other.

In embodiments, the support structure may further include a guide portion received in the second reception portion, and may slidably contact the second support portion and the second sliding portion.

In embodiments, the guide portion may include a guide groove, the second sliding portion may include a guide protrusion, and the guide protrusion may be slidably received in the guide groove.

In embodiments, the hinge shaft portion may include a hinge guide groove, the second sliding portion may include a hinge guide protrusion, and the hinge guide protrusion may be received in the hinge guide groove to slide along the hinge guide groove.

In embodiments, the first support portion may include a first hinge sliding reception portion in which the first hinge portion is received and slid, and the second support portion may include a second hinge sliding reception portion in which the second hinge portion is received and slid.

In embodiments, when the display apparatus is folded or unfolded, the first support portion may be fixed to the first non-folding area of the flexible display panel and the second support portion may be fixed to the second non-folding area of the flexible display panel.

In embodiments, the support structure may further include a guide portion that is received in the second reception portion, and contacts the second support portion and the second sliding portion to slide with respect to the second support portion and to slide with respect to the second sliding portion. When the display apparatus is folded or unfolded, the first sliding portion may slide with respect to the first support portion, the second sliding portion may slide with respect to the second support portion, and the guide portion may slide with respect to the second sliding portion and the second support portion.

In embodiments, the first hinge portion may include a support plate disposed parallel to the first non-folding area of the flexible display panel, and a hinge reception portion connected to the support plate. The hinge shaft portion may include a space in which the hinge reception portion of the first hinge portion is received.

In embodiments, a rotation axis of the first hinge portion and a rotation axis of the second hinge portion may be disposed on a same line.

In embodiments, the hinge shaft portion may include a first groove and a second groove which are connected to the space of the hinge shaft portion. When the display apparatus is unfolded, a part of the first hinge portion may be received in the first groove, and a part of the second hinge portion may be received in the second groove.

In embodiments, when the display apparatus is folded or unfolded, the first sliding portion and the second sliding portion may slide with respect to the hinge shaft portion.

In embodiments, as the display apparatus is folded, the first support portion and the second support portion may move in a direction close to the hinge shaft portion.

In embodiments, the display apparatus may further include a first back cover disposed on a bottom surface of the first support portion and may be fixed to the first hinge portion, and a second back cover disposed on a bottom surface of the second support portion and may be fixed to the second hinge portion.

In embodiments, when the display apparatus is folded, the first back cover and the second back cover may contact each other.

In embodiments, the flexible display panel may be a flexible organic light emitting diode display panel.

In embodiments, the display apparatus may further include a multi joint plate disposed between the flexible display panel and the support structure. The multi joint plate may be connected to the first non-folding area of the flexible display panel and the second non-folding area of the flexible display panel, and the multi joint plate may have a multi joint structure so as to be bendable at a portion overlapping the folding area.

In embodiments, the flexible display panel may further include a second folding area connected to the second non-folding area and a third non-folding area connected to the second folding area. The support structure may further include a third support portion that supports the third non-folding area and a hinge structure disposed between the second support portion and the third support portion.

According to embodiments, a display apparatus may include a flexible display panel including a first non-folding area, a second non-folding area, and a folding area disposed between the first non-folding area and the second non-folding area, and a support structure that supports the flexible display panel. The support structure may include a first support portion that supports the first non-folding area, a second support portion that supports the second non-folding area, and a hinge structure disposed between the first support portion and the second support portion. As the display apparatus is folded, the first support portion and the second support portion may move in a direction close to the hinge structure.

In embodiments, the hinge structure may include a hinge shaft portion disposed between the first support portion and the second support portion, and having a semi-cylindrical shape, a first hinge portion that contacts the hinge shaft portion, is rotatable about a rotation axis of the hinge shaft portion, and extends in a direction toward the first support portion, a second hinge portion that contacts the hinge shaft portion, is rotatable about the rotation axis of the hinge shaft portion, and extends in a direction toward the second support portion, a first sliding portion slidable with respect to the first support portion and the hinge shaft portion, and a second sliding portion slidable with respect to the second support portion and the hinge shaft portion.

Therefore, a display apparatus according to embodiments may include a hinge structure including components that slide with respect to each other as the display apparatus is folded or unfolded. A flexible display panel may not slide with respect to a first support portion and a second support portion of a support structure in a folded state and an unfolded state. Thus, even with repeated folding or unfolding of the display apparatus, the formation of wrinkles and other deformities in a folding area of the flexible display panel can be minimized, and the display apparatus can be completely folded without forming a gap in the folded state.

DETAILED DESCRIPTION OF THE EMBODIMENTS

Figure 1:
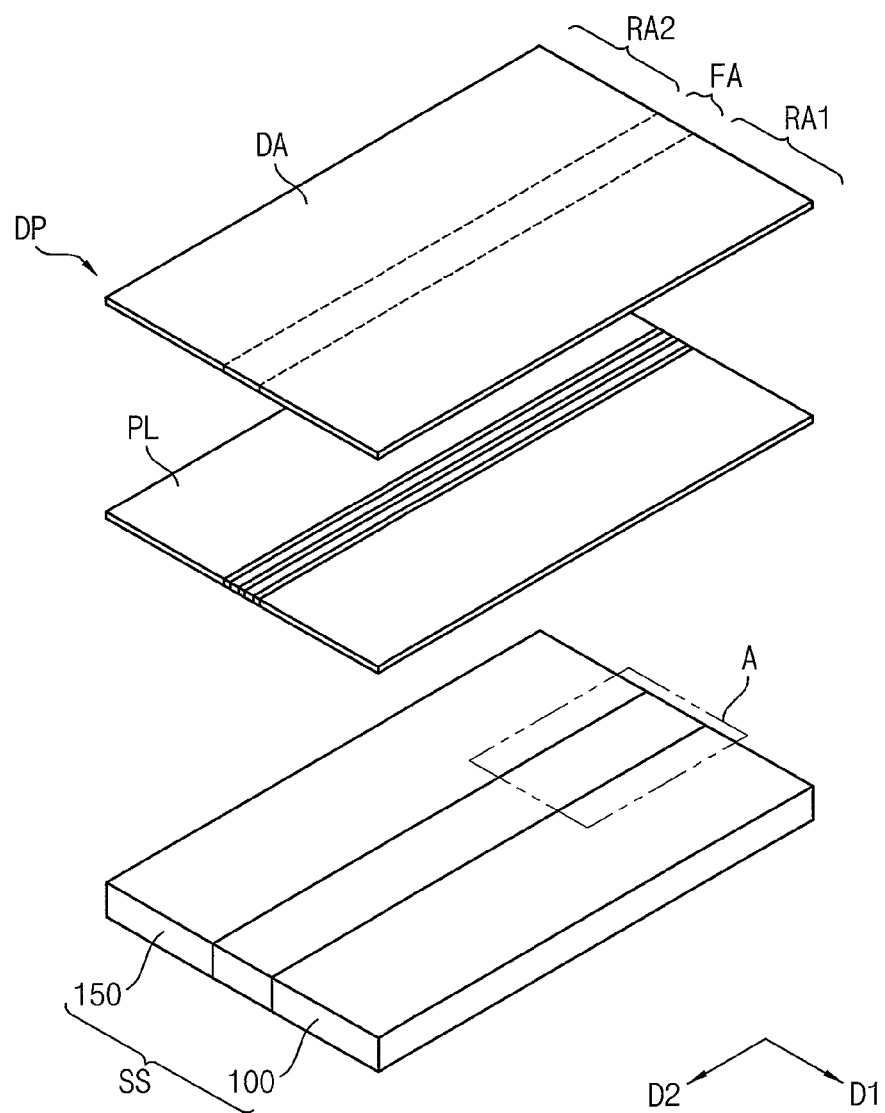
FIG. 1 is an exploded perspective view showing a display apparatus according to embodiments.

It will be understood that when an element is referred to as being related to another element such as being "on", "coupled to", "connected to", or "contacting" another element, it can be directly on, coupled to, connected to, or contacting the other element or intervening elements may be present therebetween. In contrast, it should be understood that when an element is referred to as being related to another element such as being "directly on", "directly coupled to", "directly connected to", or "directly contacting" another element, there are no intervening elements present. Other expressions that explain the relationship between elements, such as "between," "directly between," "adjacent to," or "directly adjacent to," should be construed in the same way.

Throughout the specification, the same reference numerals will refer to the same or like parts. In the drawings, the thickness, ratio, and dimension of components are exaggerated for effective description of the technical content.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, "a first element," "component," "region," "layer" or "section" discussed below could be termed a second element, component, region, layer, or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or."

As used herein, the term "and/or" includes any and all combinations of one or more of the associated listed items. For example, "A and/or B" may be understood to mean "A, B, or A and B." The terms "and" and "or" may be used in the conjunctive or disjunctive sense and may be understood to be equivalent to "and/or". Throughout the disclosure, the expression "at least one of A, B, and C" may indicate only A, only B, only C, both A and B, both A and C, both B and C, all of A, B, and C, or variations thereof.

The term "at least one of" is intended to include the meaning of "at least one selected from the group consisting of" for the purpose of its meaning and interpretation. For example, "at least one of A and B" may be understood to mean "A, B, or A and B." When preceding a list of elements, the term, "at least one of," modifies the entire list of elements and does not modify the individual elements of the list.

It will be further understood that the terms "comprises," "comprising," "includes," "including," "have," "having," "contains," and/or "containing" when used in this specification, are intended to specify the presence of stated features, regions, integers, steps, operations, elements, and/or components, but do not preclude the presence or addition of one or more other features, regions, integers, steps, operations, elements, components, and/or groups thereof.

Hereinafter, embodiments of the inventive concept will be explained in detail with reference to the accompanying drawings.

Figure 2:
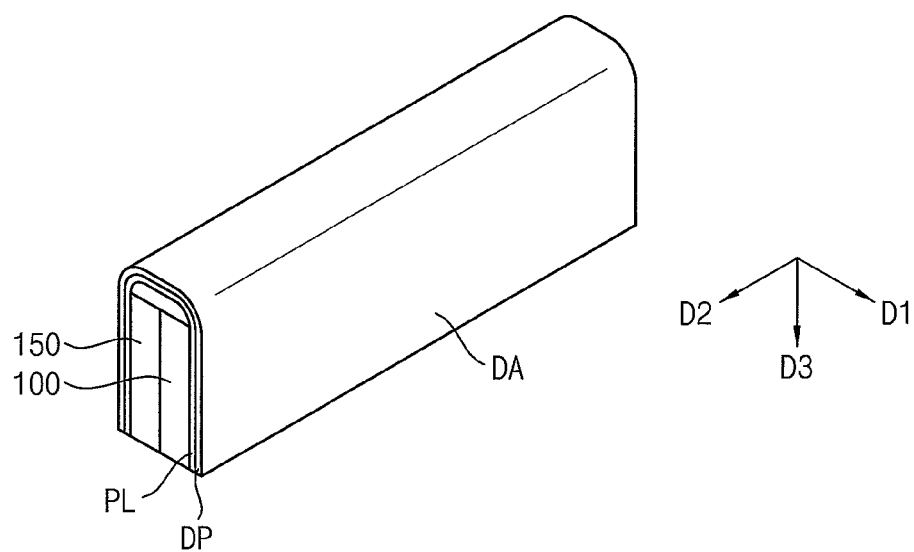
FIG. 2 is a perspective view showing a state in which the display apparatus of FIG. 1 is completely folded.

FIG. 1 is an exploded perspective view showing a display apparatus according to embodiments, and FIG. 2 is a perspective view showing a state in which the display apparatus of FIG. 1 is completely folded.

Referring to FIGS. 1 and 2, a display apparatus may include a flexible display panel DP, a plate PL, and a support structure SS.

The flexible display panel DP may be a flexible display panel for displaying an image. For example, the flexible display panel DP may include a flexible substrate and pixels disposed on the flexible substrate to display an image. Each of the pixels may include a pixel circuit including a thin film transistor, and a light emitting structure electrically connected to the pixel circuit. For example, the light emitting structure may include an organic light emitting diode.

The flexible substrate may implement a curved surface, and may include a transparent insulating material suitable for supporting conductive patterns and layers which are to be stacked. For example, the flexible substrate may include polyimide, polycarbonate, polyethylene, and the like.

The flexible display panel DP may include a first non-folding area RA1 disposed on a first support portion 100 of the support structure SS, a second non-folding area RA2 disposed on a second support portion 150 of the support structure SS, and a folding area FA disposed between the first non-folding area RA1 and the second non-folding area RA2.

The plate PL may support the flexible display panel DP. The plate PL may be disposed between the support structure SS and the flexible display panel DP, and may have a structure that may be bent correspondingly to the folding area FA. For example, the plate PL may be a multi-joint support having a multi-joint structure corresponding to the folding area FA. For example, the multi-joint structure may overlap the folding area FA. The plate PL may be formed of a material having rigidity suitable for supporting the flexible display panel DP. The plate PL may be formed of a material such as a metal or a plastic.

The support structure SS may support the plate PL and the flexible display panel DP. The support structure SS may include the first support portion 100 and the second support portion 150. The support structure SS may be formed of a material having rigidity suitable for supporting the plate PL and the flexible display panel DP. For example, the support structure SS may be formed of a material such as a metal or a plastic.

The first support portion 100 may support the first non-folding area RA1 of the flexible display panel DP. The second support portion 150 may support the second non-folding area RA2 of the flexible display panel DP. A bendable hinge structure may be formed between the first support portion 100 and the second support portion 150 to correspond to the folding area FA, and the hinge structure may include a first sliding portion (see 200 in FIG. 3), a second sliding portion (see 250 in FIG. 3), a guide portion (see 350 in FIG. 3), a first hinge portion (see 400 in FIG. 3), a second hinge portion (see 450 in FIG. 3), and a hinge shaft portion 500 which will be described below in FIG. 3. The hinge structure will be described in detail below in FIG. 3.

Figure 4A:
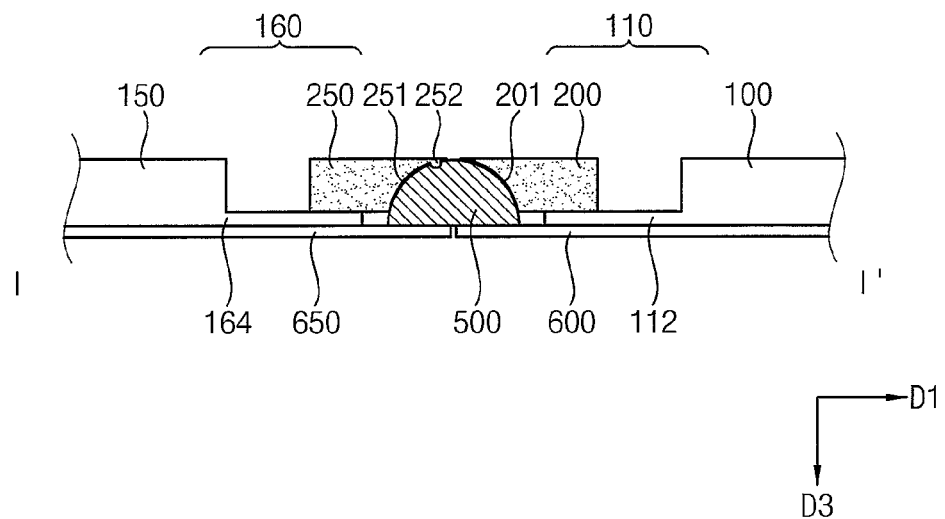
FIG. 4A is a schematic cross-sectional view taken along line I-I' in a state where the display apparatus of FIG. 3 is completely unfolded.

The display apparatus may further include first and second back covers (see 600 and 650 in FIG. 4A).

Referring again to FIG. 2, the display apparatus may be an out-folding foldable display apparatus in which a display surface DA of the flexible display panel DP faces outward in a folded state. According to the embodiment, the display apparatus may include the hinge structure, and the flexible display panel DP may not slide with respect to the first support portion 100 and the second support portion 150 of the support structure SS in the folded state and an unfolded state. Accordingly, even with repeated folding or unfolding of the display apparatus, the formation of wrinkles and other deformities in the folding area FA of the flexible display panel DP can be minimized, and the display apparatus can be completely folded without forming a gap in the folded state.

Figure 3:
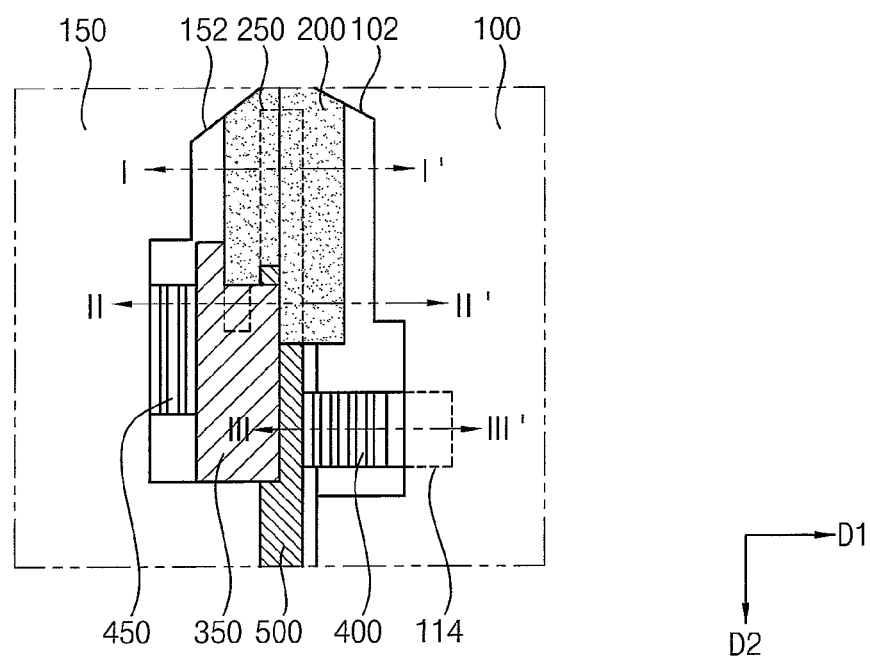
FIG. 3 is a plan view showing portion 'A' of the display apparatus of FIG. 1 in detail.
Figure 4B:
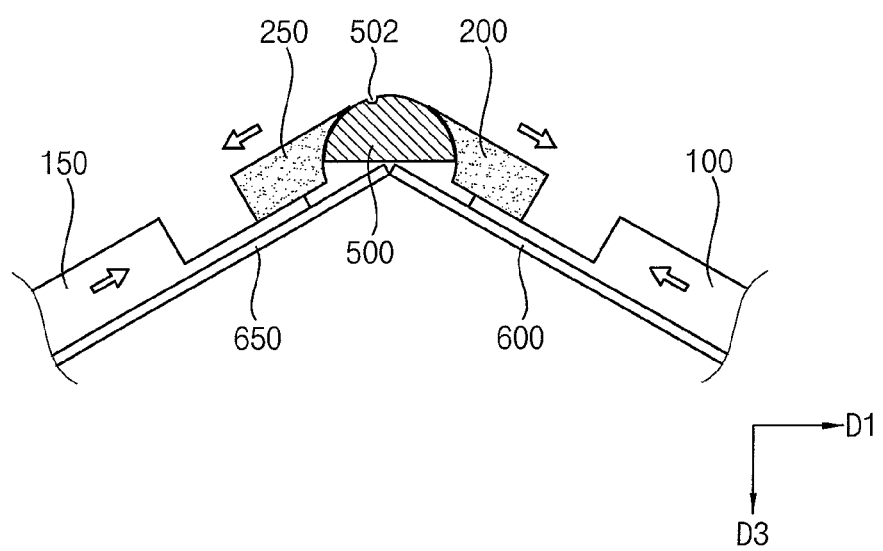
FIG. 4B is a schematic cross-sectional view taken along line I-I' in a state where the display apparatus of FIG. 3 in an unfolded state is being folded.
Figure 4C:
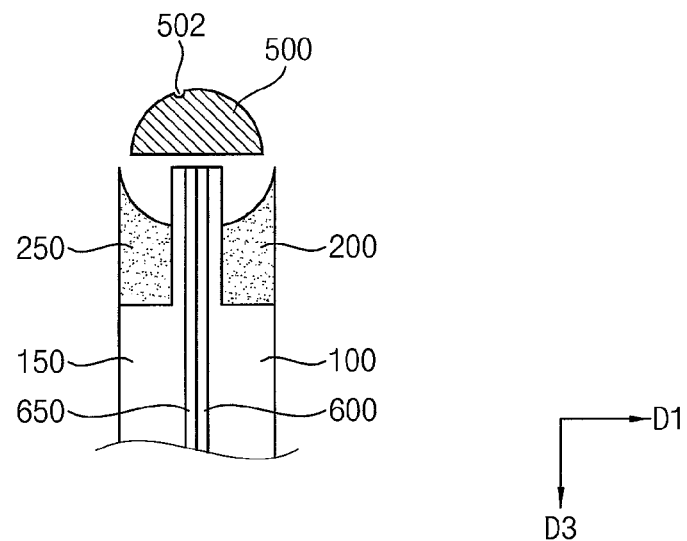
FIG. 4C is a schematic cross-sectional view taken along line I-I' in a state where the display apparatus of FIG. 3 is completely folded.
Figure 5A:
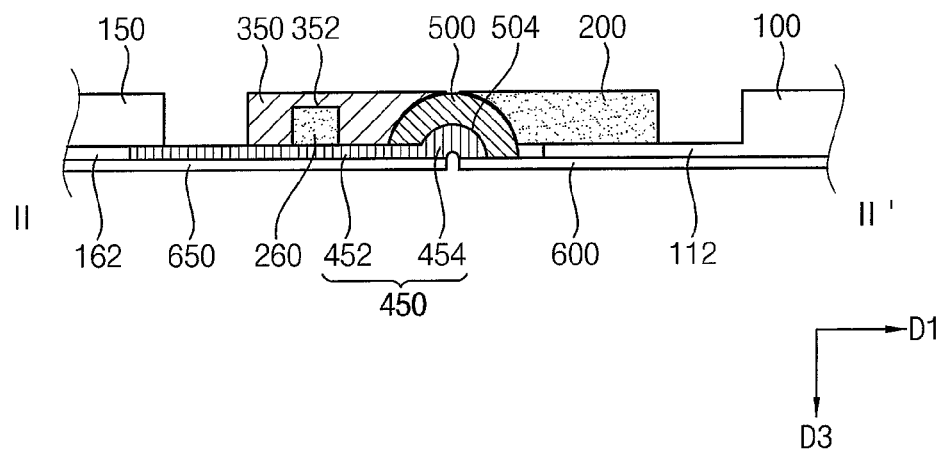
FIG. 5A is a schematic cross-sectional view taken along line II-II' in a state where the display apparatus of FIG. 3 is completely unfolded.
Figure 5B:
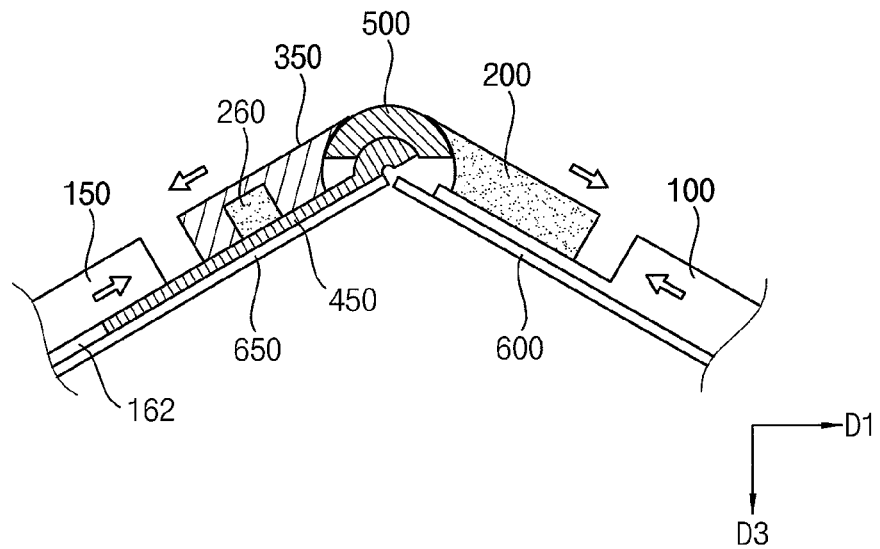
FIG. 5B is a schematic cross-sectional view taken along line II-II' in a state where the display apparatus of FIG. 3 in the unfolded state is being folded.
Figure 5C:
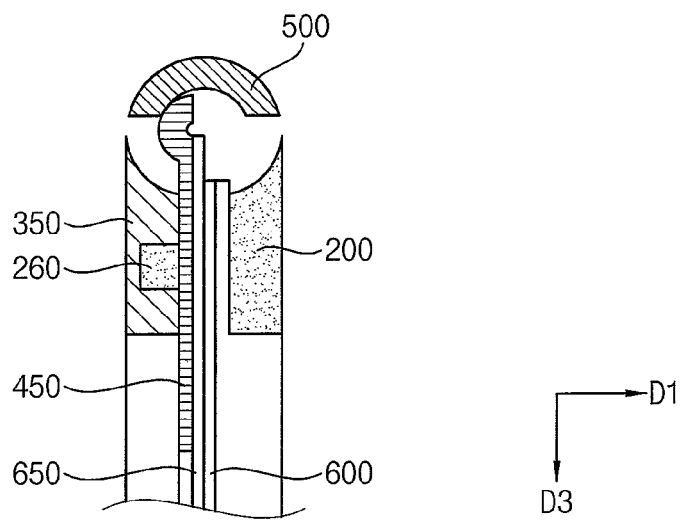
FIG. 5C is a schematic cross-sectional view taken along line II-II' in a state where the display apparatus of FIG. 3 is completely folded.
Figure 6A:
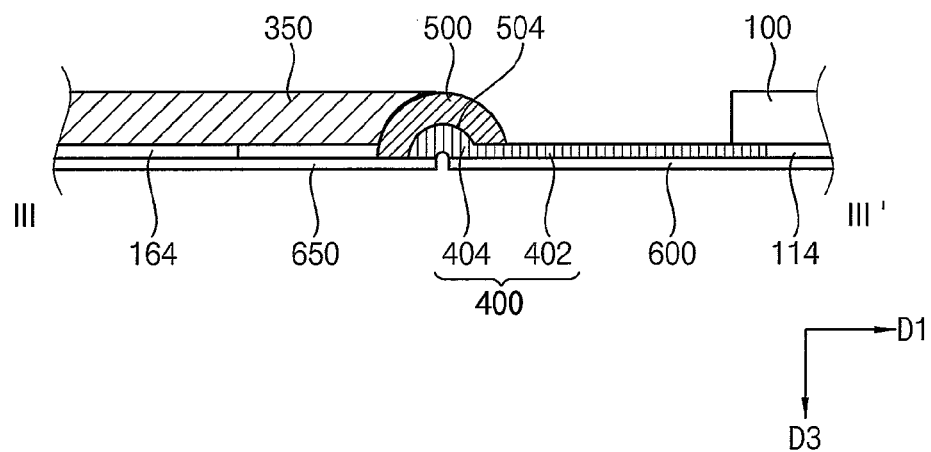
FIG. 6A is a schematic cross-sectional view taken along line III-III' in a state where the display apparatus of FIG. 3 is completely unfolded.
Figure 6B:
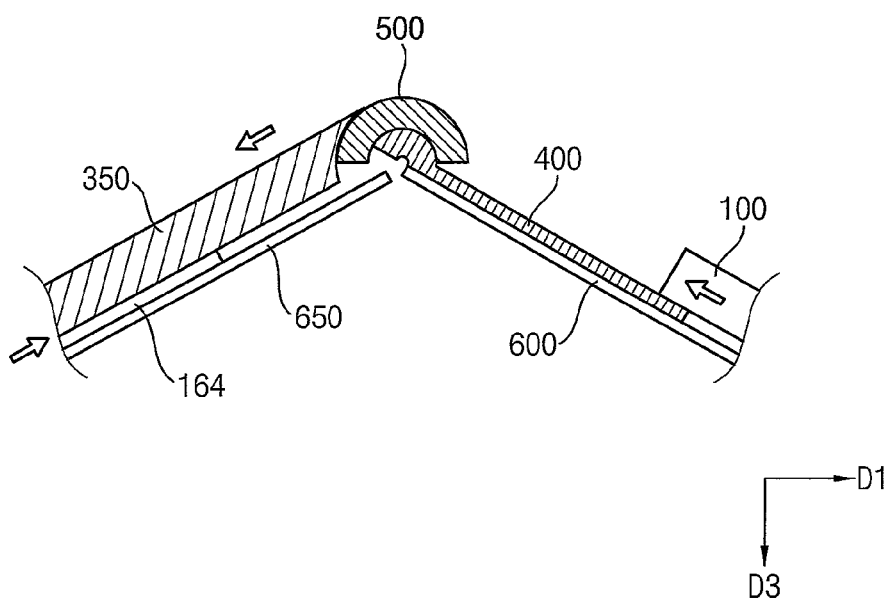
FIG. 6B is a schematic cross-sectional view taken along line III-III' in a state where the display apparatus of FIG. 3 in the unfolded state is being folded.
Figure 6C:
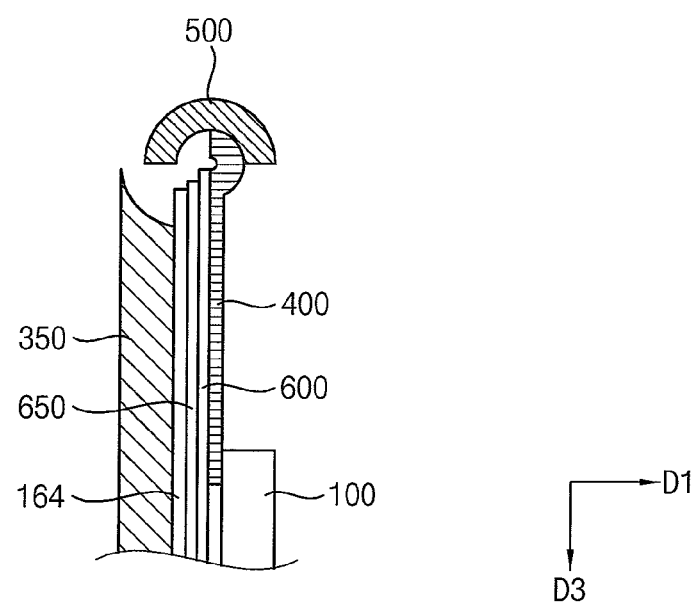
FIG. 6C is a schematic cross-sectional view taken along line III-III' in a state where the display apparatus of FIG. 3 is completely folded.
Figure 7A:
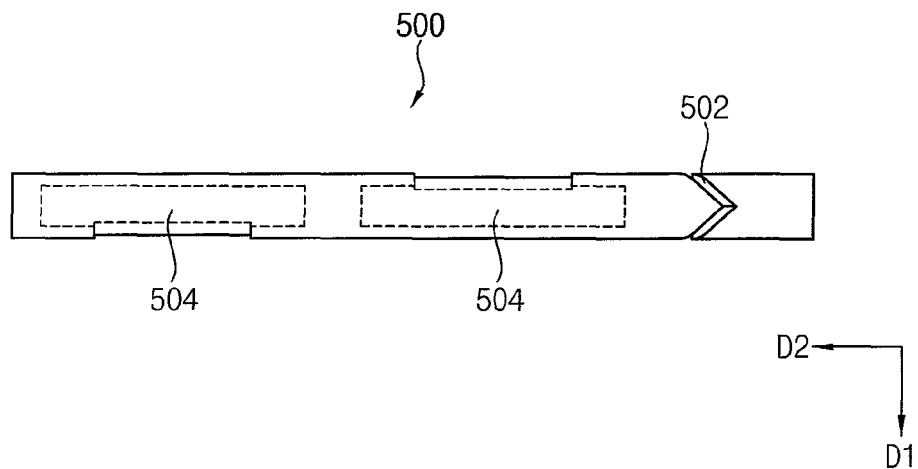
FIG. 7A is a plan view showing a hinge shaft portion of the display apparatus of FIG. 3.
Figure 7B:
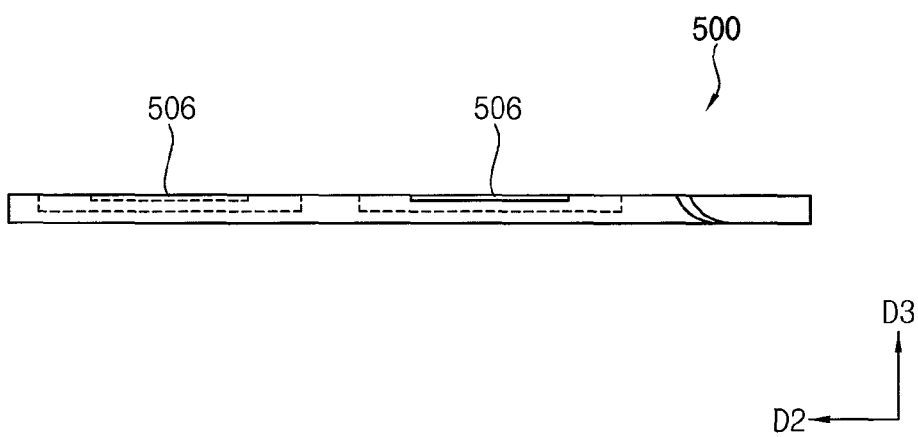
FIG. 7B is a schematic side view showing a hinge shaft portion of the display apparatus of FIG. 3 in a length direction.
Figure 7C:
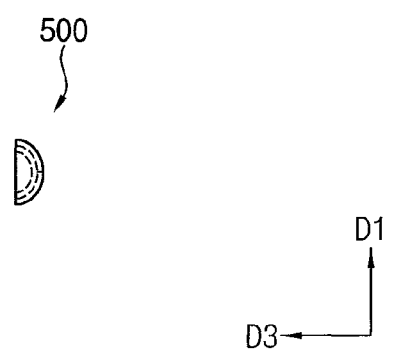
FIG. 7C is a schematic side view showing a hinge shaft portion of the display apparatus of FIG. 3 in a width direction.
Figure 8A:
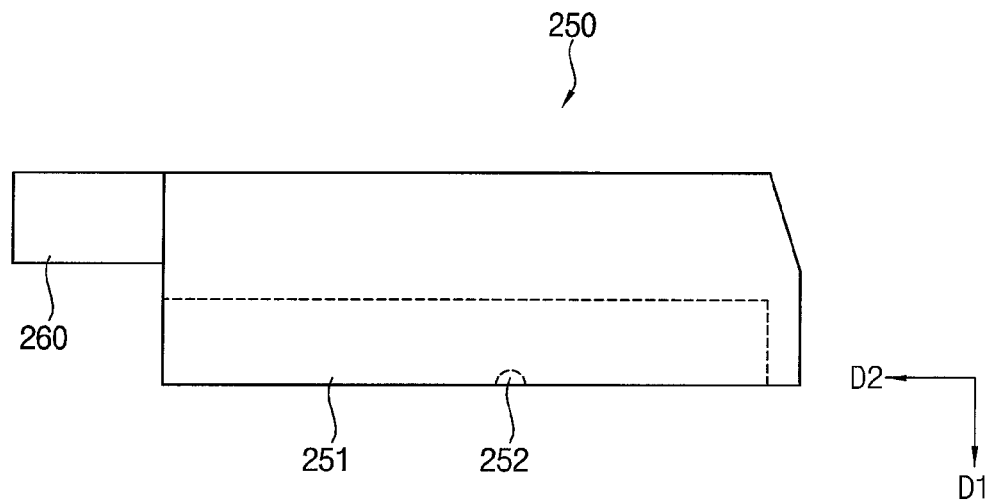
FIG. 8A is a plan view showing a second sliding portion of the display apparatus of FIG. 3.
Figure 8B:
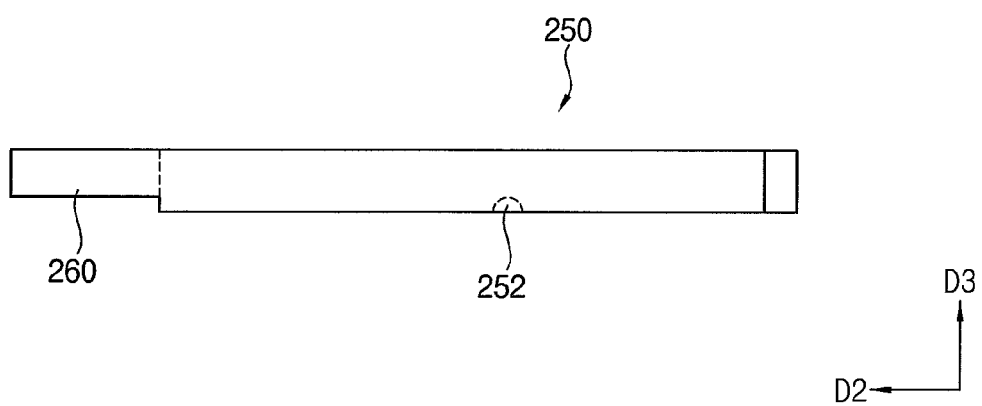
FIG. 8B is a schematic side view showing a second sliding portion of the display apparatus of FIG. 3 in a length direction.
Figure 8C:
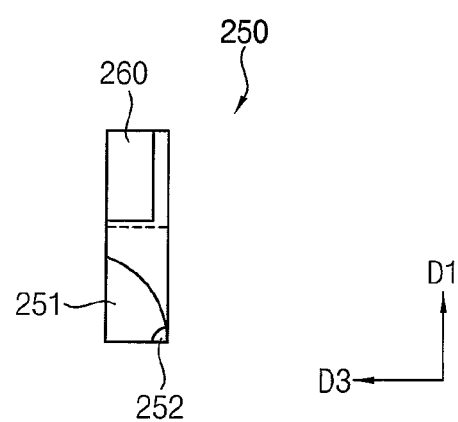
FIG. 8C is a schematic side view showing a second sliding portion of the display apparatus of FIG. 3 in a width direction.
Figure 9A:
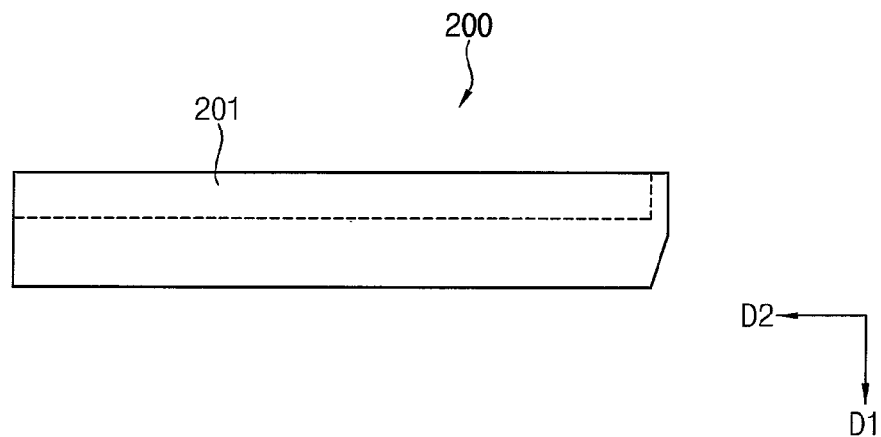
FIG. 9A is a plan view showing a first sliding portion of the display apparatus of FIG. 3.
Figure 9B:
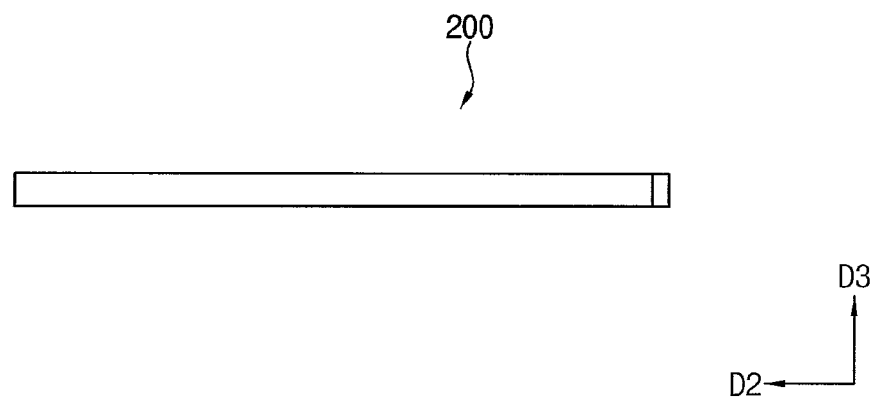
FIG. 9B is a schematic side view showing a first sliding portion of the display apparatus of FIG. 3 in a length direction.
Figure 9C:
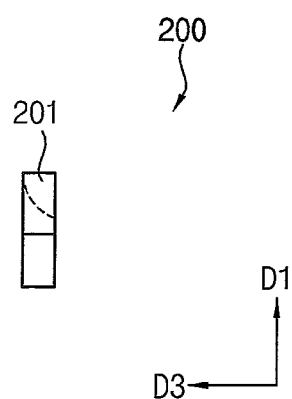
FIG. 9C is a schematic side view showing a first sliding portion of the display apparatus of FIG. 3 in a width direction.
Figure 10A:
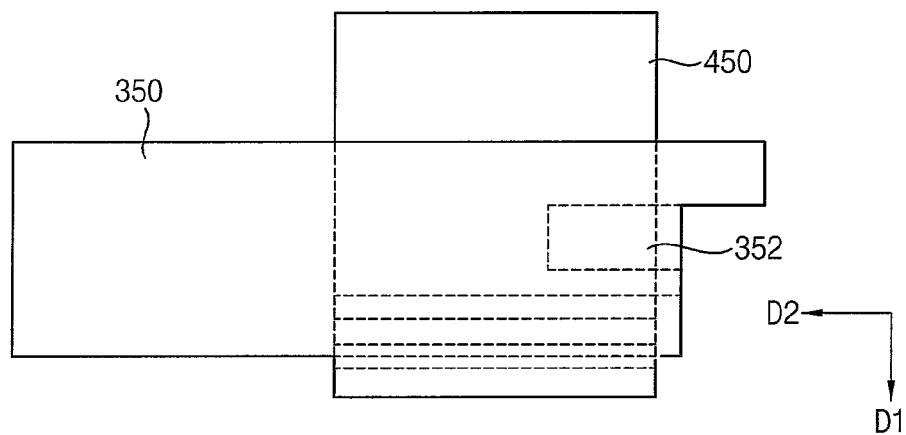
FIG. 10A is a plan view showing a guide portion and a second hinge portion of the display apparatus of FIG. 3.
Figure 10B:
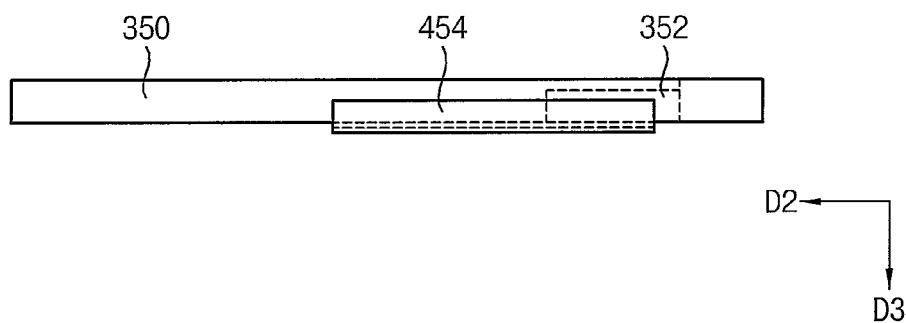
FIG. 10B is a schematic side view showing a guide portion and a second hinge portion of the display apparatus of FIG. 3 in a length direction.
Figure 10C:
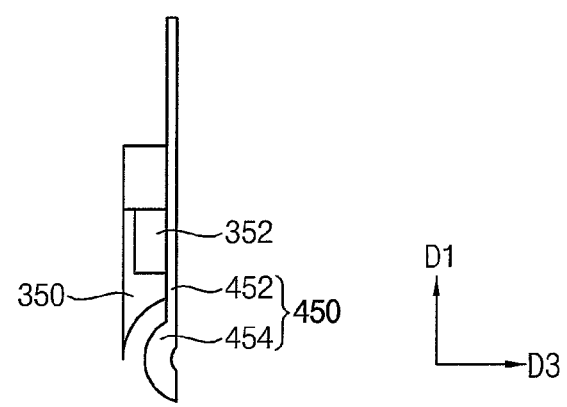
FIG. 10C is a schematic side view showing a guide portion and a second hinge portion of the display apparatus of FIG. 3 in a width direction.
Figure 11A:
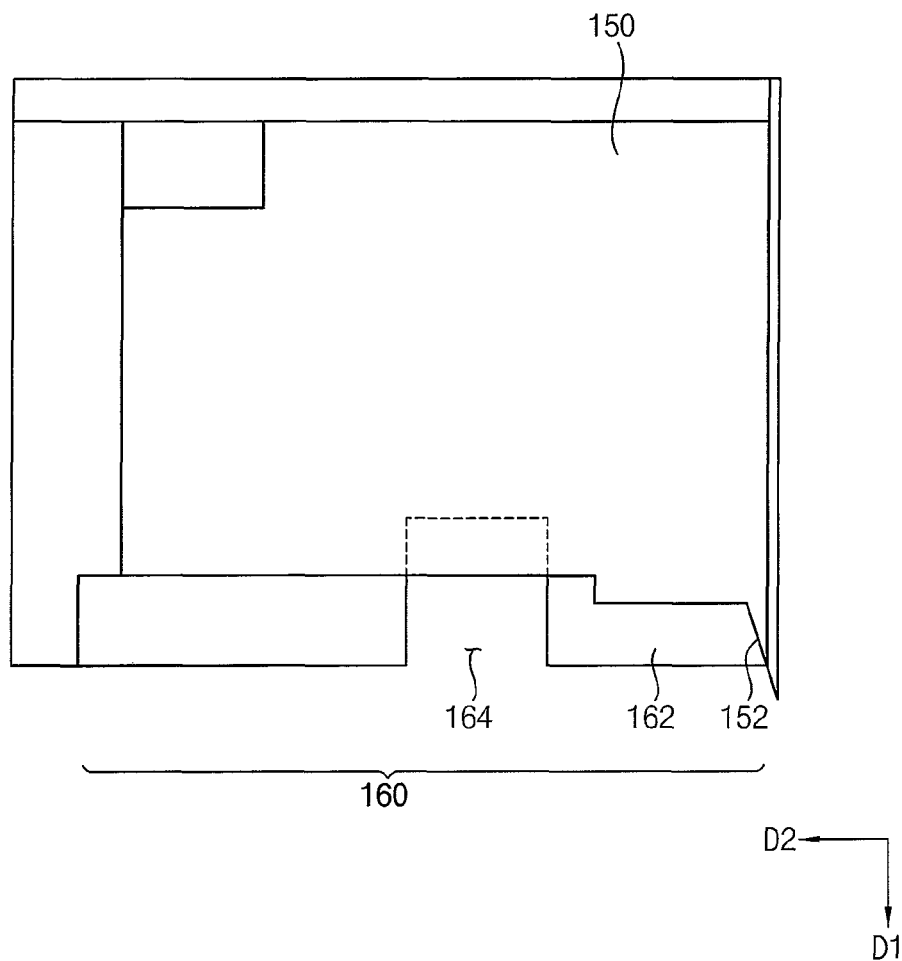
FIG. 11A is a plan view showing a second support portion of the display apparatus of FIG. 3.
Figure 11B:
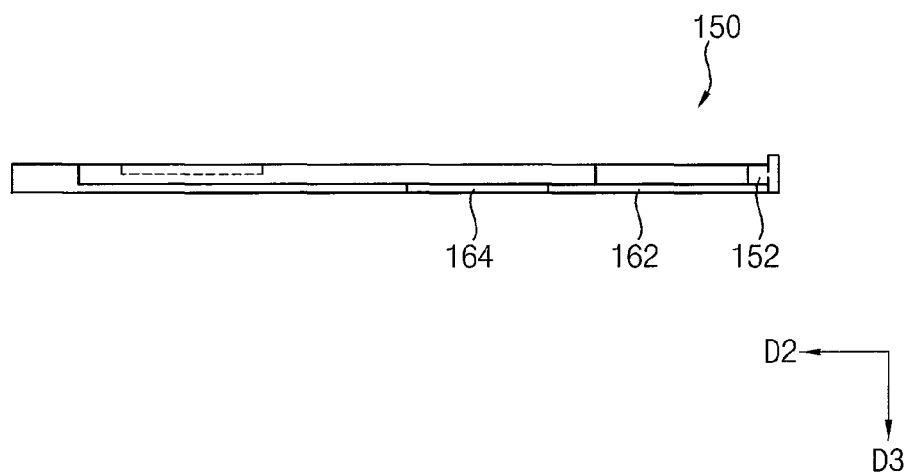
FIG. 11B is a schematic side view showing a second support portion of the display apparatus of FIG. 3 in a length direction (i.e., a longitudinal direction).
Figure 11C:
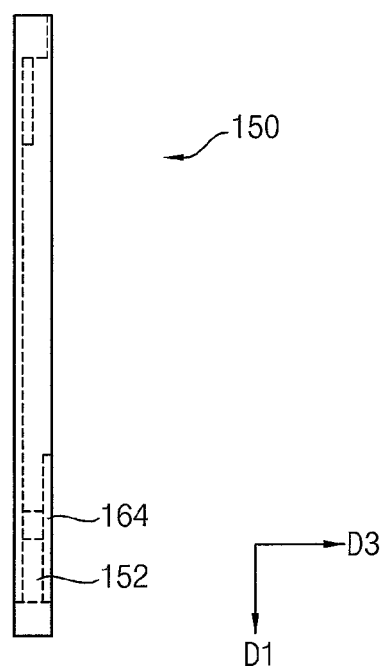
FIG. 11C is a schematic side view showing a second support portion of the display apparatus of FIG. 3 in a width direction (i.e., a transverse direction).

FIG. 3 is a plan view showing portion 'A' of the display apparatus of FIG. 1 in detail, FIG. 4A is a schematic cross-sectional view taken along line I-I' in a state where the display apparatus of FIG. 3 is completely unfolded, FIG. 4B is a schematic cross-sectional view taken along line I-I' in a state where the display apparatus of FIG. 3 in an unfolded state is being folded, FIG. 4C is a schematic cross-sectional view taken along line I-I' in a state where the display apparatus of FIG. 3 is completely folded, FIG. 5A is a schematic cross-sectional view taken along line II-II' in a state where the display apparatus of FIG. 3 is completely unfolded, FIG. 5B is a schematic cross-sectional view taken along line II-II' in a state where the display apparatus of FIG. 3 in the unfolded state is being folded, FIG. 5C is a schematic cross-sectional view taken along line II-II' in a state where the display apparatus of FIG. 3 is completely folded, FIG. 6A is a schematic cross-sectional view taken along line in III-III' a state where the display apparatus of FIG. 3 is completely unfolded, FIG. 6B is a schematic cross-sectional view taken along line III-III' in a state where the display apparatus of FIG. 3 in the unfolded state is being folded, FIG. 6C is a schematic cross-sectional view taken along line III-III' in a state where the display apparatus of FIG. 3 is completely folded, FIG. 7A is a plan view showing a hinge shaft portion of the display apparatus of FIG. 3, FIG. 7B is a schematic side view showing a hinge shaft portion of the display apparatus of FIG. 3 in a length direction, FIG. 7C is a schematic side view showing a hinge shaft portion of the display apparatus of FIG. 3 in a width direction, FIG. 8A is a plan view showing a second sliding portion of the display apparatus of FIG. 3, FIG. 8B is a schematic side view showing a second sliding portion of the display apparatus of FIG. 3 in a length direction, FIG. 8C is a schematic side view showing a second sliding portion of the display apparatus of FIG. 3 in a width direction, FIG. 9A is a plan view showing a first sliding portion of the display apparatus of FIG. 3, FIG. 9B is a schematic side view showing a first sliding portion of the display apparatus of FIG. 3 in a length direction, FIG. 9C is a schematic side view showing a first sliding portion of the display apparatus of FIG. 3 in a width direction, FIG. 10A is a plan view showing a guide portion and a second hinge portion of the display apparatus of FIG. 3, FIG. 10B is a schematic side view showing a guide portion and a second hinge portion of the display apparatus of FIG. 3 in a length direction, FIG. 10C is a schematic side view showing a guide portion and a second hinge portion of the display apparatus of FIG. 3 in a width direction, FIG. 11A is a plan view showing a second support portion of the display apparatus of FIG. 3, FIG. 11B is a schematic side view showing a second support portion of the display apparatus of FIG. 3 in a length direction (i.e., a longitudinal direction), and FIG. 11C is a schematic side view showing a second support portion of the display apparatus of FIG. 3 in a width direction (i.e., a transverse direction).

Referring to FIGS. 3 to 11C, the display apparatus may include a first support portion 100, a second support portion 150, a first sliding portion 200, a second sliding portion 250, a guide portion 350, a first hinge portion 400, a second hinge portion 450, a hinge shaft portion 500, a first back cover 600, and a second back cover 650.

The first support portion 100 may support the first non-folding area RA1 of the flexible display panel DP. The first support portion 100 may include a first reception portion 110 that receives the first sliding portion 200. The first reception portion 110 of the first support portion 100 may include a first inclined surface 102, and the first inclined surface 102 and the first sliding portion 200 may slidably contact each other. The first inclined surface 102 may be formed on a plane configured by a direction inclined at an angle with respect to a first direction D1 and a second direction D2, and a third direction D3 perpendicular to the first direction D1 and the second direction D2 (see FIGS. 3 and 4A). The first support portion 100 may include a first hinge sliding reception portion 114 in which the first hinge portion 400 is received and slid.

The second support portion 150 may support the second non-folding area RA2 of the flexible display panel DP. The second support portion 150 may include a second reception portion 160 that receives the second sliding portion 250. The second reception portion 160 of the second support portion 150 may include a second inclined surface 152, and the second inclined surface 152 and the second sliding portion 250 may slidably contact each other. The second support portion 150 may include a second hinge sliding reception portion 162 in which the second hinge portion 450 is received and slid.

The first sliding portion 200 may be slidable with respect to the first support portion 100 and the hinge shaft portion 500. The first sliding portion 200 may be formed at a bottom surface thereof with a first curved space 201 having a curved surface corresponding to an outer circumferential surface of the hinge shaft portion 500. The first sliding portion 200 may be slid along the first inclined surface 102 on a first support plate 112 of the first reception portion 110 of the first support portion 100.

The second sliding portion 250 may be slidable with respect to the second support portion 150 and the hinge shaft portion 500. The second sliding portion 250 may be formed at a bottom surface thereof with a second curved space 251 having a curved surface corresponding to the outer circumferential surface of the hinge shaft portion 500. A hinge guide protrusion 252 may be formed in the second curved space 251. The hinge guide protrusion 252 may be received in a hinge guide groove 502 of the hinge shaft portion 500, which will be described below so as to be slid along the hinge guide groove 502. The second sliding portion 250 may be slid along the second inclined surface 152 on a second support plate 164 of the second reception portion 160 of the second support portion 150.

The guide portion 350 may be received in the second reception portion 160 of the second support portion 150. The guide portion 350 may contact the second support portion 150 and the second sliding portion 250 to slide with respect to the second support portion 150 and to slide with respect to the second sliding portion 250.

The guide portion 350 may include a guide groove 352, and the second sliding portion 250 may include a guide protrusion 260, so that the guide protrusion 260 may be slidably received in the guide groove 352.

The first hinge portion 400 may contact the hinge shaft portion 500 so as to be rotatable about a rotation axis of the hinge shaft portion 500. The first hinge portion 400 may include a first hinge support plate 402 that extends in a direction toward the first support portion 100, and a first hinge reception portion 404 connected to the first hinge support plate 402. The first hinge reception portion 404 may be received in a space 504 inside the hinge shaft portion 500 to rotate about the rotation axis of the hinge shaft portion 500. The first hinge support plate 402 of the first hinge portion 400 may be disposed parallel to the first non-folding area RA1 of the flexible display panel DP.

The second hinge portion 450 may contact the hinge shaft portion 500 so as to be rotatable about the rotation axis of the hinge shaft portion 500. The second hinge portion 450 may include a second hinge support plate 452 that extends in a direction toward the second support portion 150, and a second hinge reception portion 454 connected to the second hinge support plate 452. The second hinge reception portion 454 may be received in the space 504 inside the hinge shaft portion 500 to rotate about the rotation axis of the hinge shaft portion 500. The second hinge support plate 452 of the second hinge portion 450 may be disposed parallel to the second non-folding area RA2 of the flexible display panel DP.

A rotation axis of the first hinge portion 400 and a rotation axis of the second hinge portion 450 may be disposed on a same line.

The hinge shaft portion 500 may be disposed between the first support portion 100 and the second support portion 150, and may have a semi-cylindrical shape. The hinge shaft portion 500 may include the hinge guide groove 502, and the hinge guide protrusion 252 of the second sliding portion 250 may be received in the hinge guide groove 502 to slide along the hinge guide groove 502. The hinge shaft portion 500 may include the space 504 in which the first hinge reception portion 404 of the first hinge portion 400 and the second hinge reception portion 454 of the second hinge portion 450 are received.

The hinge shaft portion 500 may include a first groove 506 connected to the space 504, and when the display apparatus is unfolded, a part of the first hinge portion 400 and a part of the second hinge portion 450 may be received in the first groove 506.

The first back cover 600 may be disposed on a bottom surface of the first support portion 100 and fixed to the first hinge portion 400.

The second back cover 650 may be disposed on a bottom surface of the second support portion 150 and fixed to the second hinge portion 450.

As the display apparatus is folded, the first support portion 100 and the second support portion 150 may move in a direction close to the hinge shaft portion 500. When the display apparatus is folded, the first and second back covers 600 and 650 may contact each other.

When the display apparatus is folded or unfolded, the first sliding portion 200 and the second sliding portion 250 may slide with respect to the hinge shaft portion 500. When the display apparatus is folded or unfolded, the first support portion 100 and the second support portion 150 may be fixed to the first non-folding area RA1 and the second non-folding area RA2 of the flexible display panel DP, respectively.

When the display apparatus is folded or unfolded, the first sliding portion 200 may slide with respect to the first support portion 100 and the second sliding portion 250 may slide with respect to the second support portion 150, and the guide portion 350 may slide with respect to the second sliding portion 250 and the second support portion 150.

For convenience of description, only the support structure SS is shown in FIGS. 3 to 10C except for the flexible display panel (see DP in FIG. 1) and the plate (see PL in FIG. 1).

Although not shown, the above-described hinge structure may be symmetrically provided in an opposite direction with respect to the hinge shaft 500. For example, the same structure as the hinge structure may be formed at a position which is point-symmetric with respect to a center of the display apparatus, so that a stable hinge structure may be implemented.

According to the embodiment, the display apparatus may include a hinge structure including components that slide with respect to each other as the display apparatus is folded or unfolded, and the flexible display panel may not slide with respect to the first support portion and the second support portion of the support structure in the folded state and the unfolded state. Accordingly, even with the repeated folding or unfolding of the display apparatus, the formation of wrinkles and other deformities in the folding area of the flexible display panel can be minimized, and the display apparatus can be completely folded without forming a gap in the folded state.

Figure 12:
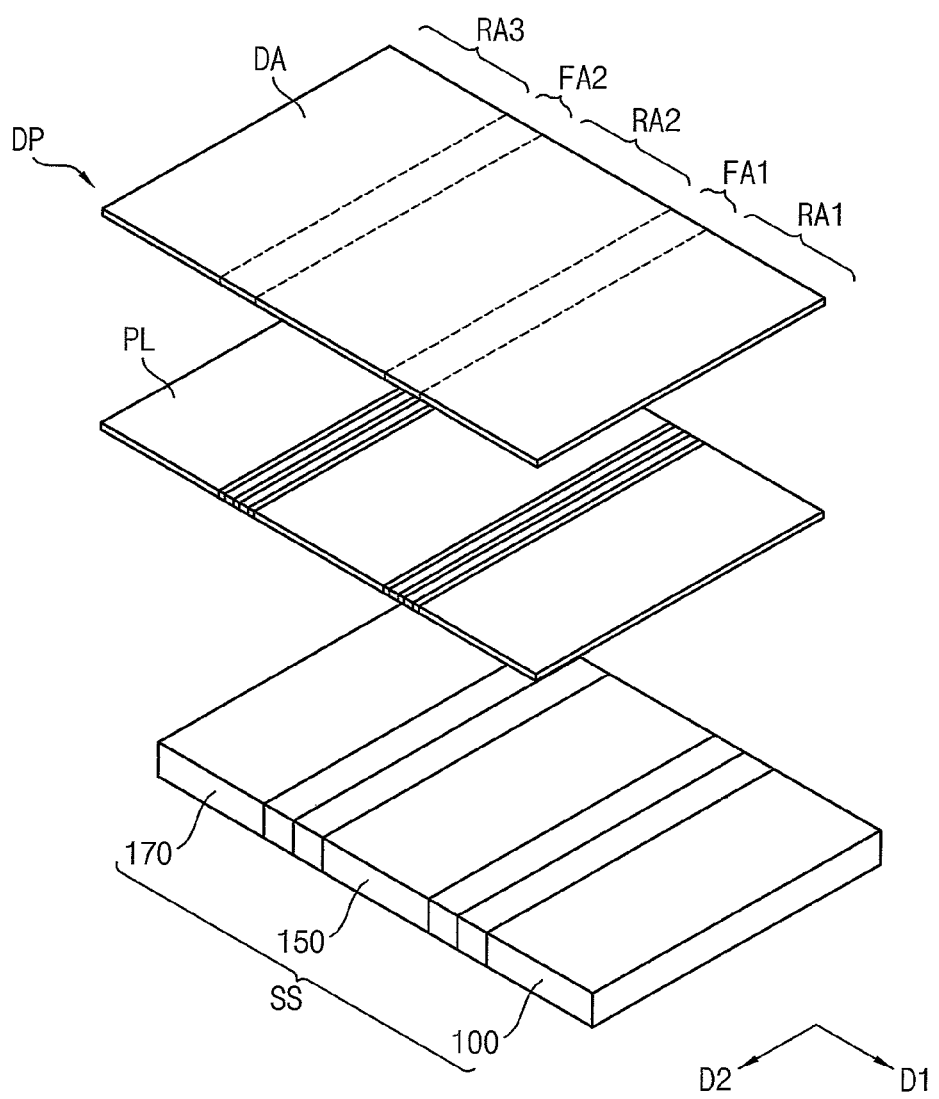
FIG. 12 is an exploded perspective view showing a display apparatus according to embodiments.
Figure 13:
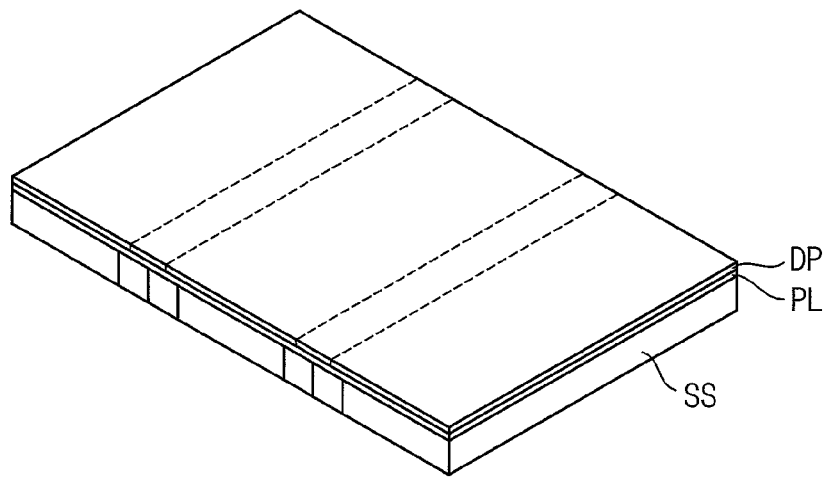
FIG. 13 is a perspective view showing a state where the display apparatus of FIG. 12 is completely unfolded.
Figure 14A:
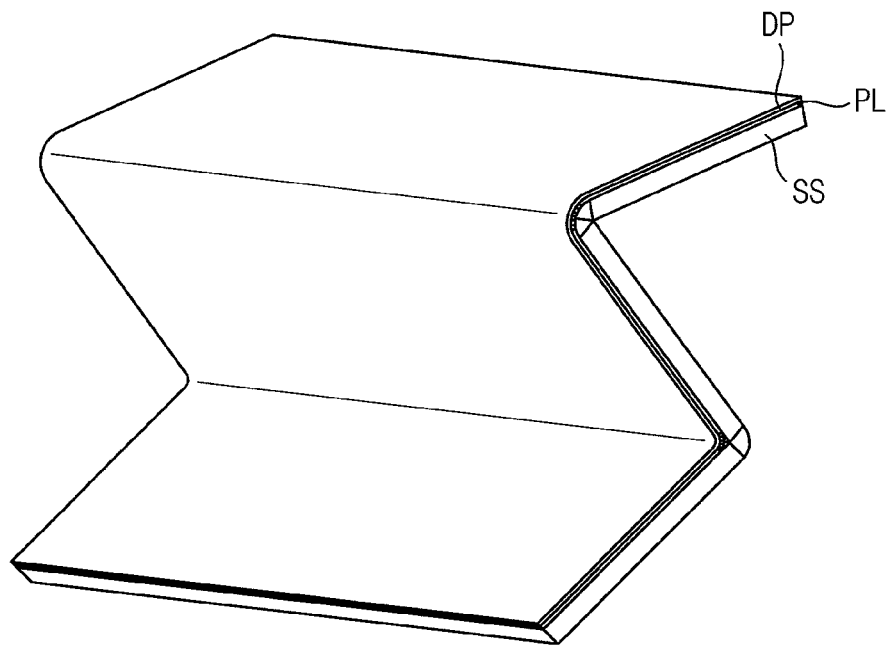
FIG. 14A is a perspective view showing a state where the display apparatus of FIG. 12 in an unfolded state is being folded.
Figure 14B:
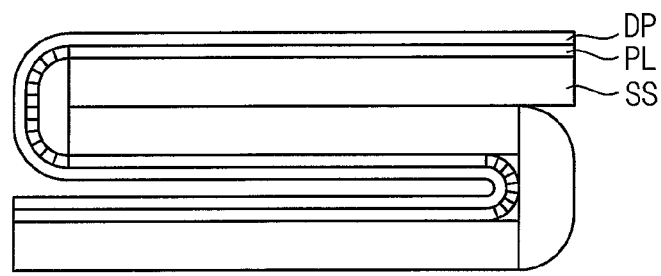
FIG. 14B is a schematic cross-sectional view showing a state where the display apparatus of FIG. 12 is completely folded.

FIG. 12 is an exploded perspective view showing a display apparatus according to embodiments, FIG. 13 is a perspective view showing a state where the display apparatus of FIG. 12 is completely unfolded, FIG. 14A is a perspective view showing a state where the display apparatus of FIG. 12 in an unfolded state is being folded, and FIG. 14B is a schematic cross-sectional view showing a state where the display apparatus of FIG. 12 is completely folded.

Referring to FIGS. 12 to 14B, a display apparatus may include a flexible display panel DP, a plate PL, and a support structure SS.

The flexible display panel DP may be a flexible display panel for displaying an image.

The flexible display panel DP may include a first non-folding area RA1 fixed to a first support portion 100 of the support structure SS, a second non-folding area RA2 fixed to a second support portion 150 of the support structure SS, a third non-folding area RA3 fixed to a third support portion 170 of the support structure SS, a first folding area FA1 disposed between the first non-folding area RA1 and the second non-folding area RA2, and a second folding area FA2 disposed between the second non-folding area RA2 and the third non-folding area RA3.

The configuration of the display apparatus in the first non-folding area RA1, the first folding area FA1, and the second non-folding area RA2 is substantially the same as the configuration of the display apparatus shown in FIGS. 1 to 11C. In the embodiment, an in-folding hinge structure may be additionally applied to the second folding area FA, so that a multi-foldable display apparatus may be implemented.

Various known structures may be applied to the in-folding hinge structure, so that detailed descriptions thereof will be omitted.

Figure 15:
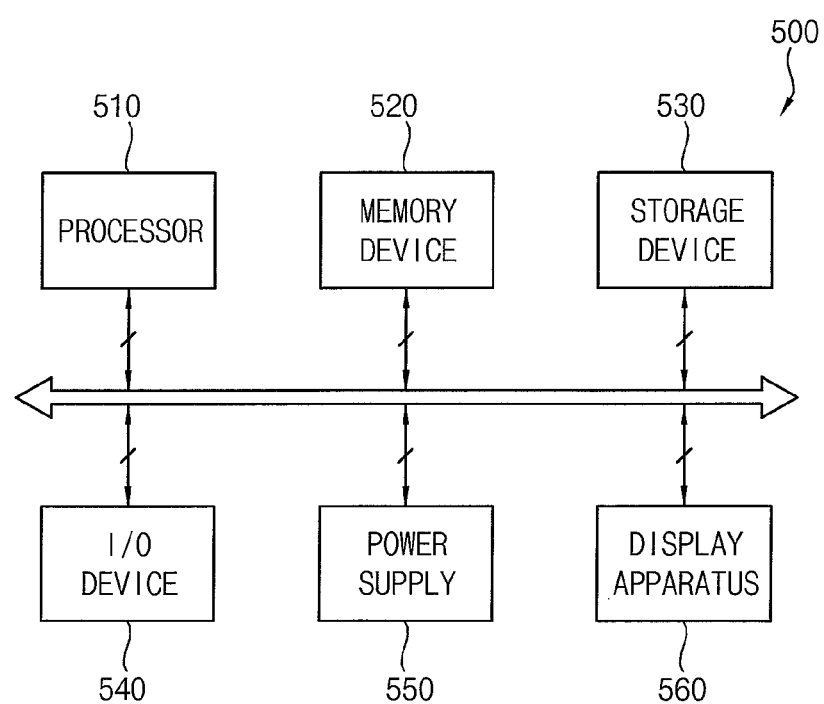
FIG. 15 is a block diagram illustrating an electronic device according to embodiments.

FIG. 15 is a block diagram illustrating an electronic device according to embodiments.

Referring to FIG. 15, the electronic device 500 may include a processor 510, a memory device 520, a storage device 530, an input/output (I/O) device 540, a power supply 550, and a display apparatus 560. Here, the display apparatus 560 may be the display apparatus of FIG. 1. The electronic device 500 may further include ports for communicating with a video card, a sound card, a memory card, a universal serial bus (USB) device, other electronic devices, etc. In an embodiment, the electronic device 500 may be implemented as a television. In another embodiment, the electronic device 500 may be implemented as a smart phone. However, the electronic device 500 is not limited thereto. For example, the electronic device 500 may be implemented as a cellular phone, a video phone, a smart pad, a smart watch, a tablet PC, a car navigation system, a computer monitor, a laptop, a head mounted display (HMD) apparatus, etc.

The processor 510 may perform various computing functions. The processor 510 may be a microprocessor, a central processing unit (CPU), an application processor (AP), etc. The processor 510 may be electrically coupled to other components via an address bus, a control bus, a data bus, etc. The processor 510 may be electrically coupled to an extended bus such as a peripheral component interconnection (PCI) bus. The memory device 520 may store data for operations of the electronic device 500. For example, the memory device 520 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. and/or at least one volatile memory device such as a dynamic random access memory (DRAM) device, a static random access memory (SRAM) device, a mobile DRAM device, etc. The storage device 530 may include a solid state drive (SSD) device, a hard disk drive (HDD) device, a CD-ROM device, etc. The I/O device 540 may include an input device such as a keyboard, a keypad, a mouse device, a touch-pad, a touch-screen, etc., and an output device such as a printer, a speaker, etc. The power supply 550 may provide power for operations of the electronic device 500.

The display apparatus 560 may be electrically coupled to other components via buses or other communication links. In embodiments, the I/O device 540 may include the display apparatus 560. As described above, the display apparatus 560 may include a hinge structure including components that slide with respect to each other as the display apparatus 560 is folded or unfolded, and a flexible display panel included in the display apparatus 560 may not slide with respect to first and second support portions of a support structure in a folded state and a unfolded state. Accordingly, even with repeated folding or unfolding of the display apparatus 560, the formation of wrinkles and other deformities in a folding area of the flexible display panel can be minimized, and the display apparatus 560 can be completely folded without forming a gap in the folded state. Since these are described above, duplicated description related thereto will not be repeated.

The inventive concept may be applied to a display apparatus and an electronic device including the display apparatus. For example, the inventive concept may be applied to a smart phone, a cellular phone, a video phone, a smart pad, a smart watch, a tablet PC, a car navigation system, a television, a computer monitor, a laptop, a head mounted display apparatus, etc.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A display apparatus comprising:
a flexible display panel including a first non-folding area, a second non-folding area, and a folding area disposed between the first non-folding area and the second non-folding area; and
a support structure that supports the flexible display panel, wherein the support structure includes:
a first support portion that supports the first non-folding area;
a second support portion that supports the second non-folding area;
a hinge shaft portion disposed between the first support portion and the second support portion, and having a semi-cylindrical shape;
a first hinge portion that contacts the hinge shaft portion, is rotatable about a rotation axis of the hinge shaft portion, and extends in a direction toward the first support portion;
a second hinge portion that contacts the hinge shaft portion, is rotatable about the rotation axis of the hinge shaft portion, and extends in a direction toward the second support portion;
a first sliding portion slidable with respect to the first support portion and the hinge shaft portion; and
a second sliding portion slidable with respect to the second support portion and the hinge shaft portion.

2. The display apparatus of claim 1, wherein
the first support portion includes a first reception portion that receives the first sliding portion,
the second support portion includes a second reception portion that receives the second sliding portion,
the first reception portion of the first support portion includes a first inclined surface,
the first inclined surface and the first sliding portion slidably contact each other,
the second reception portion of the second support portion includes a second inclined surface, and
the second inclined surface and the second sliding portion slidably contact each other.

3. The display apparatus of claim 2, wherein the support structure further includes a guide portion received in the second reception portion, and slidably contacting the second support portion and the second sliding portion.

4. The display apparatus of claim 3, wherein
the guide portion includes a guide groove,
the second sliding portion includes a guide protrusion, and
the guide protrusion is slidably received in the guide groove.

5. The display apparatus of claim 1, wherein
the hinge shaft portion includes a hinge guide groove,
the second sliding portion includes a hinge guide protrusion, and
the hinge guide protrusion is received in the hinge guide groove to slide along the hinge guide groove.

6. The display apparatus of claim 1, wherein
the first support portion includes a first hinge sliding reception portion in which the first hinge portion is received and slid, and
the second support portion includes a second hinge sliding reception portion in which the second hinge portion is received and slid.

7. The display apparatus of claim 1, wherein when the display apparatus is folded or unfolded, the first support portion is fixed to the first non-folding area of the flexible display panel and the second support portion is fixed to the second non-folding area of the flexible display panel.

8. The display apparatus of claim 7, wherein
the support structure further includes a guide portion that is received in the second reception portion, and contacts the second support portion and the second sliding portion to slide with respect to the second support portion and to slide with respect to the second sliding portion, and
when the display apparatus is folded or unfolded, the first sliding portion slides with respect to the first support portion, the second sliding portion slides with respect to the second support portion, and the guide portion slides with respect to the second sliding portion and the second support portion.

9. The display apparatus of claim 1, wherein
the first hinge portion includes:
a support plate disposed parallel to the first non-folding area of the flexible display panel; and
a hinge reception portion connected to the support plate, and
the hinge shaft portion includes a space in which the hinge reception portion of the first hinge portion is received.

10. The display apparatus of claim 9, wherein a rotation axis of the first hinge portion and a rotation axis of the second hinge portion are disposed on a same line.

11. The display apparatus of claim 10, wherein
the hinge shaft portion includes a first groove and a second groove which are connected to the space of the hinge shaft portion, and
when the display apparatus is unfolded, a part of the first hinge portion is received in the first groove, and a part of the second hinge portion is received in the second groove.

12. The display apparatus of claim 1, wherein when the display apparatus is folded or unfolded, the first sliding portion and the second sliding portion slide with respect to the hinge shaft portion.

13. The display apparatus of claim 1, wherein as the display apparatus is folded, the first support portion and the second support portion move in a direction close to the hinge shaft portion.

14. The display apparatus of claim 1, further comprising:
a first back cover disposed on a bottom surface of the first support portion and fixed to the first hinge portion; and
a second back cover disposed on a bottom surface of the second support portion and fixed to the second hinge portion.

15. The display apparatus of claim 14, wherein when the display apparatus is folded, the first back cover and the second back cover contact each other.

16. The display apparatus of claim 1, wherein the flexible display panel is a flexible organic light emitting diode display panel.

17. The display apparatus of claim 1, further comprising:
a multi-joint plate disposed between the flexible display panel and the support structure, wherein
the multi joint plate is connected to the first non-folding area of the flexible display panel and the second non-folding area of the flexible display panel, and
the multi joint plate has a multi joint structure so as to be bendable at a portion overlapping the folding area.

18. The display apparatus of claim 1, wherein
the flexible display panel further includes:
a second folding area connected to the second non-folding area; and
a third non-folding area connected to the second folding area, and
the support structure further includes:
a third support portion that supports the third non-folding area; and
a hinge structure disposed between the second support portion and the third support portion.

19. A display apparatus comprising:
a flexible display panel including a first non-folding area, a second non-folding area, and a folding area disposed between the first non-folding area and the second non-folding area; and
a support structure that supports the flexible display panel, wherein the support structure includes:
a first support portion that supports the first non-folding area;
a second support portion that supports the second non-folding area; and
a hinge structure disposed between the first support portion and the second support portion,
wherein as the display apparatus is folded, the first support portion and the second support portion move in a direction close to the hinge structure.

20. The display apparatus of claim 19, wherein the hinge structure includes:
a hinge shaft portion disposed between the first support portion and the second support portion, and having a semi-cylindrical shape;
a first hinge portion that contacts the hinge shaft portion, is rotatable about a rotation axis of the hinge shaft portion, and extends in a direction toward the first support portion;
a second hinge portion that contacts the hinge shaft portion, is rotatable about the rotation axis of the hinge shaft portion, and extends in a direction toward the second support portion;
a first sliding portion slidable with respect to the first support portion and the hinge shaft portion; and
a second sliding portion slidable with respect to the second support portion and the hinge shaft portion.

* * * * *